(12) United States Patent
Shrewsbury (10) Patent No.: US 10,876,520 B2
(45) Date of Patent: Dec. 29, 2020

(54) SPEED-CONTROLLING TRANSMISSION OR APPARATUS

(71) Applicant: Bruce Logan Shrewsbury, El Paso, TX (US)

(72) Inventor: Bruce Logan Shrewsbury, El Paso, TX (US)

( * ) Notice: Subject to any disclaimer, the term of this patent is extended or adjusted under 35 U.S.C. 154(b) by 0 days.

(21) Appl. No.: 16/544,897

(22) Filed: Aug. 19, 2019

(65) Prior Publication Data

US 2020/0102936 A1 Apr. 2, 2020

Related U.S. Application Data

(63) Continuation-in-part of application No. 15/297,078, filed on Oct. 18, 2016, now Pat. No. 10,385,824.

(51) Int. Cl.
| | |
|---|---|
| *F03D 15/00* | (2016.01) |
| *F16H 21/46* | (2006.01) |
| *F03D 7/02* | (2006.01) |
| *F16C 1/18* | (2006.01) |
| *F16C 1/02* | (2006.01) |

(52) U.S. Cl.
CPC .......... *F03D 15/00* (2016.05); *F03D 7/0276* (2013.01); *F16C 1/02* (2013.01); *F16C 1/18* (2013.01); *F16H 21/46* (2013.01)

(58) Field of Classification Search
None
See application file for complete search history.

(56) References Cited

U.S. PATENT DOCUMENTS

| | | | | | |
|---|---|---|---|---|---|
| 4,365,935 | A | * | 12/1982 | Zukeran | .................... F03D 7/06 |
| | | | | | 416/117 |
| 4,496,283 | A | * | 1/1985 | Kodric | .................... F03D 3/067 |
| | | | | | 416/119 |
| 5,570,997 | A | * | 11/1996 | Pratt | ....................... F03D 3/067 |
| | | | | | 416/117 |
| 6,857,846 | B2 | * | 2/2005 | Miller | ....................... F03D 3/02 |
| | | | | | 415/4.2 |
| 7,677,862 | B2 | * | 3/2010 | Boatner | .................. F03D 3/068 |
| | | | | | 415/4.2 |
| 8,133,023 | B2 | * | 3/2012 | Reitz | ....................... F03D 1/025 |
| | | | | | 416/1 |
| 8,272,840 | B2 | * | 9/2012 | Yan | ......................... F03D 3/061 |
| | | | | | 416/107 |
| 2007/0014658 | A1 | * | 1/2007 | Mollinger | ............... F03D 3/005 |
| | | | | | 415/4.2 |
| 2015/0118050 | A1 | * | 4/2015 | Joosten | ................... F03D 3/005 |
| | | | | | 416/117 |

* cited by examiner

*Primary Examiner* — Sunit Pandya
(74) *Attorney, Agent, or Firm* — Hoang Steve Ngo (57) ABSTRACT

The first aspect of the present invention is a speed-controlling transmission or apparatus. In a non-limiting example, the speed-controlling transmission or apparatus is adapted for use with driving, driven or energy-related devices, apparatuses or systems. The second aspect of the present invention is a wind turbine apparatus that comprises a wind turbine and a speed-controlling transmission or apparatus. A non-limiting example of a wind turbine includes a mandrel, a plurality of supporting arms or trusses, and a plurality of umbrella-like vanes. The wind turbine is adapted for rotating in a generally circular orientation with respect to the vertical axis of a turbine-receiving structure during operation wherein the circular orientation is generally parallel to a ground surface.

28 Claims, 9 Drawing Sheets

SPEED-CONTROLLING TRANSMISSION OR APPARATUS

CROSS-REFERENCE TO RELATED APPLICATION

The present application is a continuation-in-part application of and claims the priority benefit of U.S. Nonprovisional patent application Ser. No. 15/297,078, filed on Oct. 18, 2016 and issuing as U.S. Pat. No. 10,385,824 on Aug. 20, 2019, which is incorporated herein by reference in its entirety.

BACKGROUND OF THE INVENTION

Field of the Invention

The present invention generally relates to devices, components, apparatuses, and systems related to speed-controlling transmissions or apparatuses and wind turbines. More specifically, the first aspect of the present invention is a speed-controlling transmission or apparatus. The second aspect of the present invention is a wind turbine apparatus that comprises a wind turbine and a speed-controlling transmission or apparatus.

Description of the Related Art

Devices, components, apparatuses, and systems related to speed-controlling transmissions or apparatuses and wind turbines are known in the art.

High winds exceed safe speed parameters of mechanical wind-driven devices, such as, but not limited to, wind turbines. Some wind turbines may convert natural wind energy into mechanical work energy by interrupting wind with its large surfaces that the wind acts upon by forcing them into motion. The speed-controlling transmission or apparatus of the present invention uses the same wind that drives the wind-driven devices to automatically slow it to within safe or satisfactory velocity limitations, not by braking, but by producing power at a faster rate. Low or gentle winds have little or no effect upon some or many wind-driven devices. The "solid wall" effect of some or many wind-driven devices, coupled with the speed-controlling transmission, causes energy conversion from wind speeds as low as 1 to 2 mph winds. Centrifugal force, in conjunction with a counter weight, causes threaded rods to turn, raising and lowering an adjustable fulcrum upon which depends a lever that drives air compressor or pump pistons, giving great resistance to excessive wind velocities or exercising a higher ratio of driving force upon pistons, depending upon position of fulcrum which is automatically positioned by wind velocity through the speed-controlling transmission or apparatus of the present invention.

The Applicant is unaware of inventions or patents, taken either singly or in combination, which are seen to describe the present invention as claimed.

SUMMARY OF THE INVENTION

The first aspect of the present invention is a speed-controlling transmission or apparatus. In a non-limiting example, the speed-controlling transmission or apparatus is adapted for use with driving, driven or energy-related devices, apparatuses or systems.

The second aspect of the present invention is a wind turbine apparatus that comprises a wind turbine and a speed-controlling transmission or apparatus. A non-limiting example of a wind turbine includes a mandrel, a plurality of supporting arms or trusses, and a plurality of umbrella-like vanes. The wind turbine is adapted for rotating in a generally circular orientation with respect to the vertical axis of a turbine-receiving structure during operation wherein the circular orientation is generally parallel to a ground surface.

It should be understood that the above-attached figures are not intended to limit the scope of the present invention in any way.

DETAILED DESCRIPTION OF THE ASPECTS OF THE PRESENT INVENTION

Figure 7:
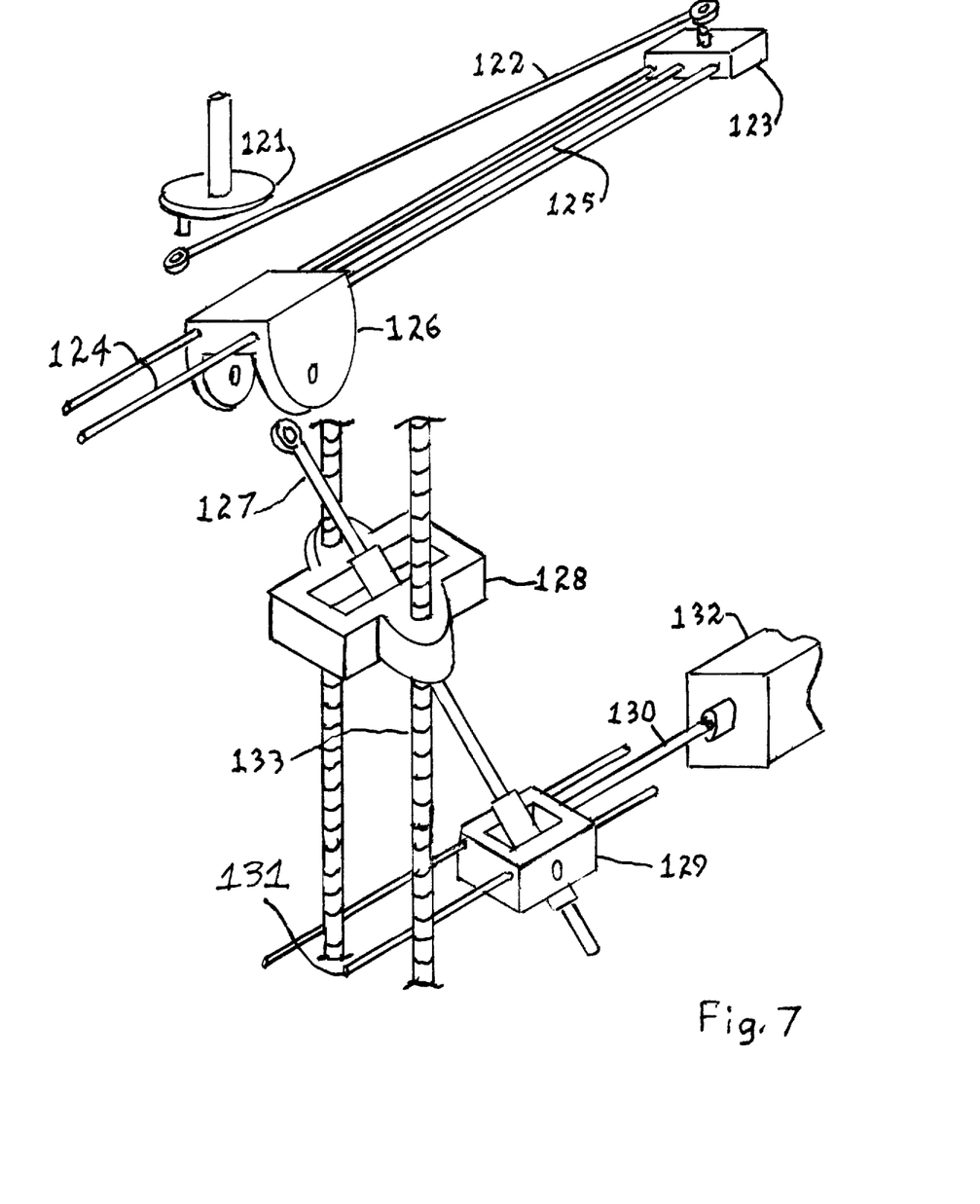
FIG. 7 is a perspective view of a first partial section of a speed-controlling transmission or apparatus according to the present invention.
Figure 8:
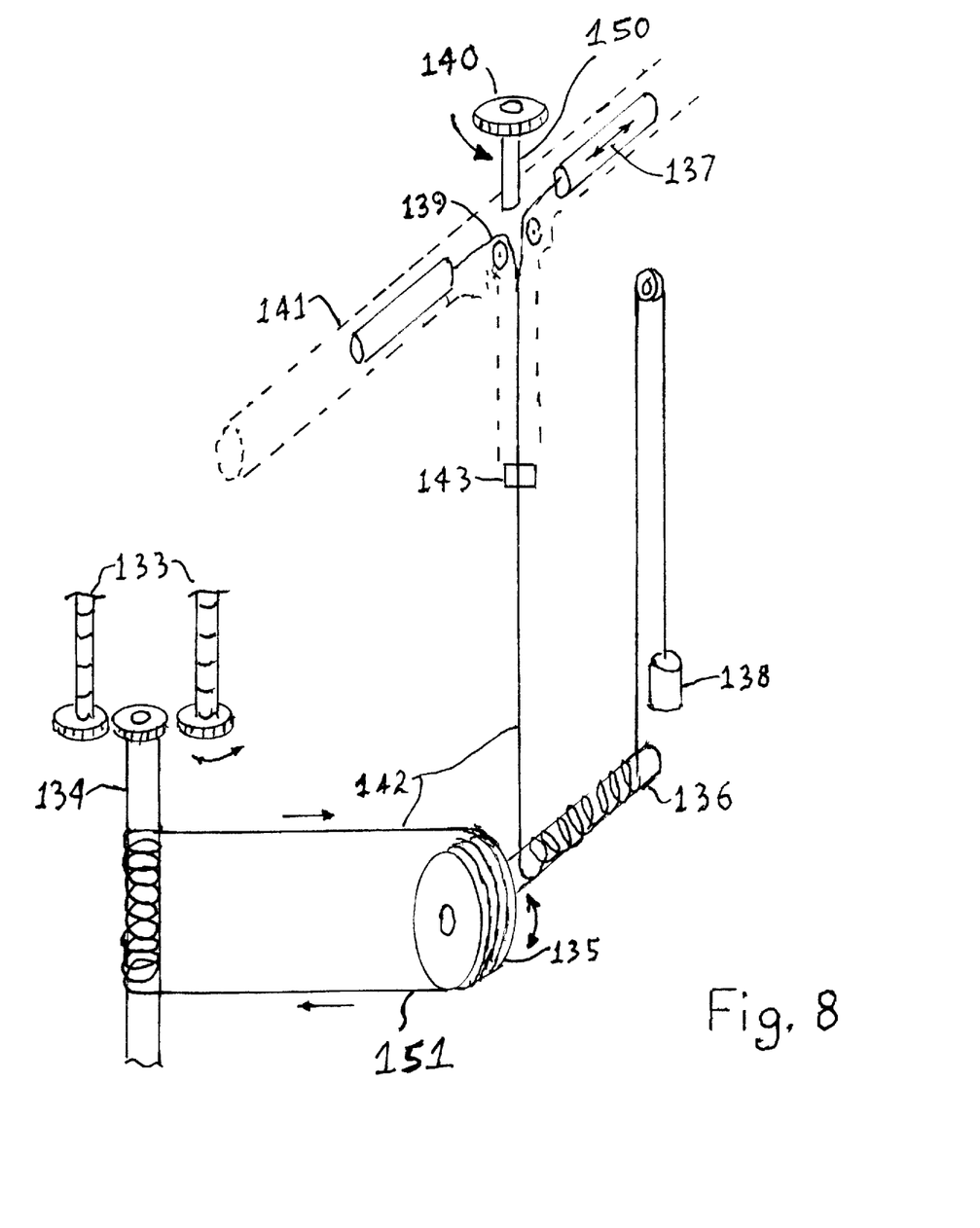
FIG. 8 is a perspective view of a second partial section of the speed-controlling transmission or apparatus of FIG. 7.
Figure 9:
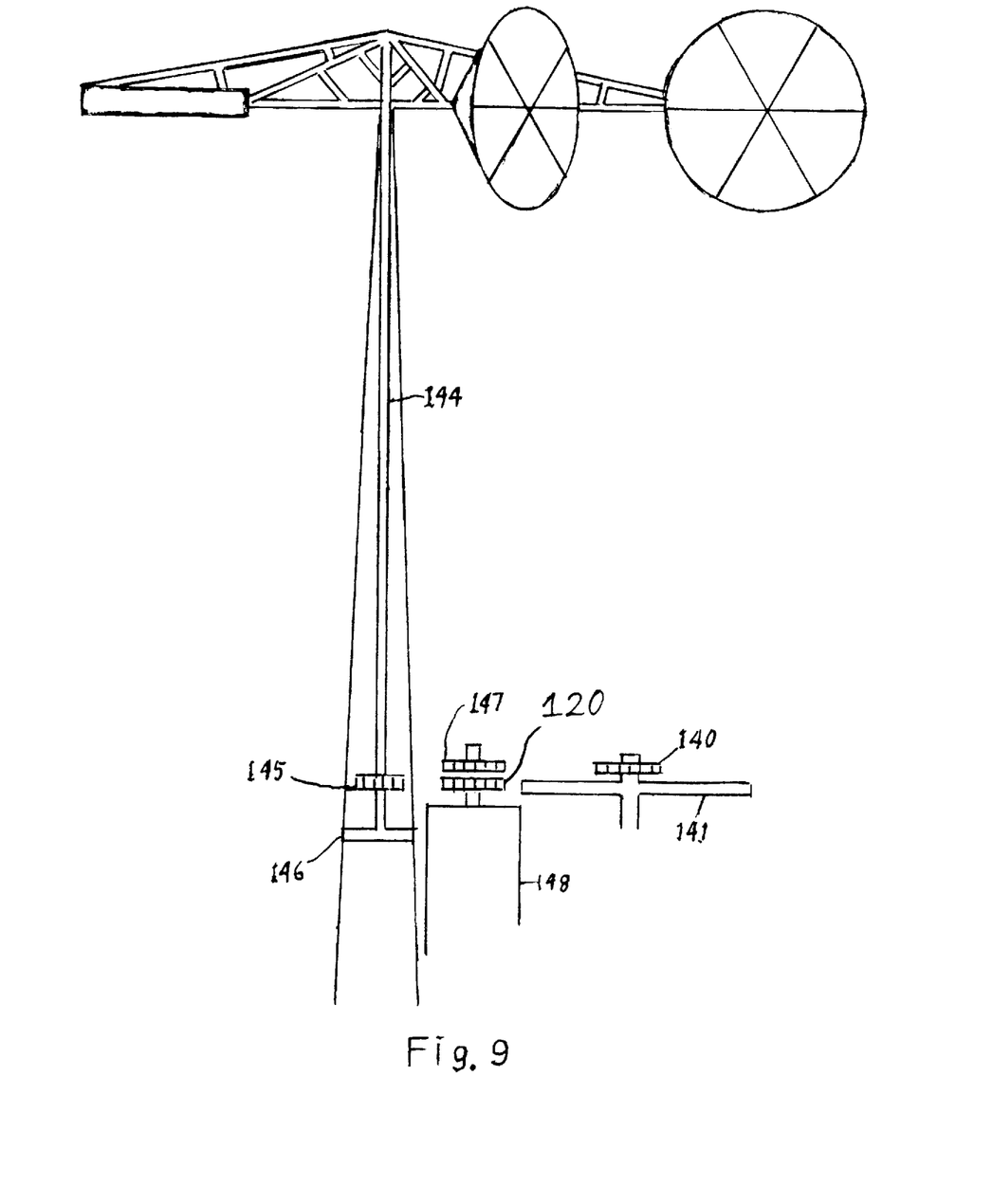
FIG. 9 is an environmental, elevational view of the speed-controlling transmission or apparatus of FIGS. 7 and 8, wherein the speed-controlling transmission or apparatus is secured, attached or mounted at a lower end of a turbine-receiving structure, which includes a wind turbine mounted upon its upper end.

Referring to FIGS. 7-9, the first aspect of the present invention is a speed-controlling transmission or apparatus 120. As a non-limiting example, the speed-controlling transmission or apparatus 120 is adapted for use with driving, driven or energy-related devices, apparatuses or systems, such as, but not limited to, wind-driven devices, rotation-driven devices, piston-driven engines (such as gasoline or diesel engines), electric engines, air motors, hydraulic motors, and any device, apparatus or system where the power of the device, apparatus or system is affected by the velocity. The output power from the speed-controlling transmission or apparatus 120 will be dependent upon the velocity times the power of the driving, driven or energy-related device, apparatus or system.

As a non-limiting example, the speed-controlling transmission or apparatus 120 preferably includes many, most or all of the following components: drive hub 121, drive rod 122, drive block 123, guide rails 124, drive rod 125, drive block 126, lever 127, adjustable fulcrum 128, drive block 129, drive rod 130, guide rails 131, compressor or pump 132, acme threaded rods 133, shaft 134, drum 135, shaft 136, centrifuge weights 137, weight 138, cable 139, sprocket or pulley 140, centrifuge housing 141, cable 142, bearing assembly 143, shaft 144, sprocket 145, a support and bearing 146, double sprocket 147, transmission housing 148, cable 149, a centrifuge-turning shaft 150, and a cable 151.

As best shown in FIGS. 7 and 8, the speed-controlling transmission or apparatus 120, in operation or use, may be in operational use or communication with a wind-driven device 101, such as, but not limited to, a wind turbine 101. The wind-driven device 101 turns, rotates or moves drive hub 121, which pushes and pulls drive rod 122, which then pushes and pulls drive block 123, which travels on guide rails 124 while moving to drive drive rod 125 to drive drive block 126 driving lever 127 backward and forward, which acting in conjunction with adjustable fulcrum 128 and drive block 129 moves drive rod 130 on guide rails 131 to push and pull the reciprocating connecting/drive rod 130 that drives the compressor or pump piston back and forth to compress gaseous material or to pump liquid. Compressor or pump 132 is shown to place it in context with the speed-controlling transmission 120. Fulcrum 128 and drive block 129 both allow lever 127 to slide up and down in them while fulcrum and driving actions take place. Acme threaded rods 133 are rotated forward or backward to raise or lower the adjustable fulcrum 128 to change the ratio of power to compressor or pump 132 while concurrently giving resistance to wind turbine 101. The resistance slows turbine action as would a braking mechanism but it slows the wind turbine 101, not by braking, but by converting more energy to usable power. Threaded Rods 133 are turned forward or backward by shaft 134 which is turned by pull of cable 142 that is pulled up and down by bearing assembly 143, which is pulled up and down by centrifuge weights 137. Bearing assembly 143 allows cable 139 to spin with centrifuge while being raised and lowered while it allows cable 142 to not spin as it is raised and lowered. Sprocket or pulley 140 spins centrifuge housing 141 wherein weights 137, being spun about 360 degrees, create varying amounts of centrifugal force to pull cable 139 which pulls bearing assembly 143 which pulls cable 142 which turns shaft 136, turning drum 135 (sized to establish proper ratio) and by cable 149 from drum 135, being wound around shaft 134 which turns threaded rods 133 to raise adjustable fulcrum 128. Weight 138 reverses direction of the cable action when lower winds allow for this and pulls the cables in a downward direction, thereby reversing all the action described above. Shaft 134 turns acme threaded rods 133, to raise or lower adjustable fulcrum 128 so that lever either exerts greater force upon work or greater resistance to turning of wind turbine 101 while always converting wind into work to a greater or lesser degree. The centrifuge-turning shaft 150 turns or drives the centrifuge housing 141. The cable 151 drives shaft 134 from drum 135.

FIG. 9 shows shaft 144 that is connected to and driven by and with wind turbine 101. Shaft 144 drives sprocket 145 which drives double sprocket 147 that drives speed-controlling transmission or apparatus 120 and drives sprocket 140 that drives centrifuge housing 141. Sprockets are driven by chains, which are left out and not shown for clarity. There is a support and bearing 146 for bottom end of shaft 144. Transmission housing 148 houses speed-controlling transmission or apparatus 120, and can mount together with tower 2 on tower foundation or it can be bolted to tower 2 at any convenient place below the wind turbine 101. Centrifuge housing 141 attaches to transmission housing 148 or is built as an extension of the speed-controlling transmission or apparatus 120.

Referring to FIGS. 1-6 and 9, the second aspect of the present invention is a wind turbine apparatus 100 that comprises a wind turbine 1 and a speed-controlling transmission or apparatus (preferably something that is similar to, substantially similar to, or exactly the same as the speed-controlling transmission or apparatus 120).

As a non-limiting example and as best shown in FIGS. 1-6, the wind turbine 1 comprises a rotating mandrel 3, a plurality of arms or trusses 5 extending laterally away from and mounted, secured or attached to the mandrel 3, and a plurality of umbrella-like vanes 6,7 mounted, secured or attached on the ends of arms or trusses 5 opposite mandrel 3. The mandrel 3 is adapted for being sufficiently secured for operation to a turbine-receiving structure 2, such as a tower or pole 2, having a generally vertical axis and a sufficient height. The plurality of arms or trusses 5 and plurality of umbrella-like vanes 6,7 are adapted for rotating in a generally circular orientation with respect to the vertical axis of the structure 2 during operation wherein the circular orientation is generally parallel to a ground surface.

Preferably, the wind turbine 1 comprises six (6) umbrella-like vanes 6,7 that are proportionally positioned relative to the mandrel 3 to provide an efficient energy-producing apparatus when the wind turbine 1 is secured upon the tower or pole 2.

Figure 1:
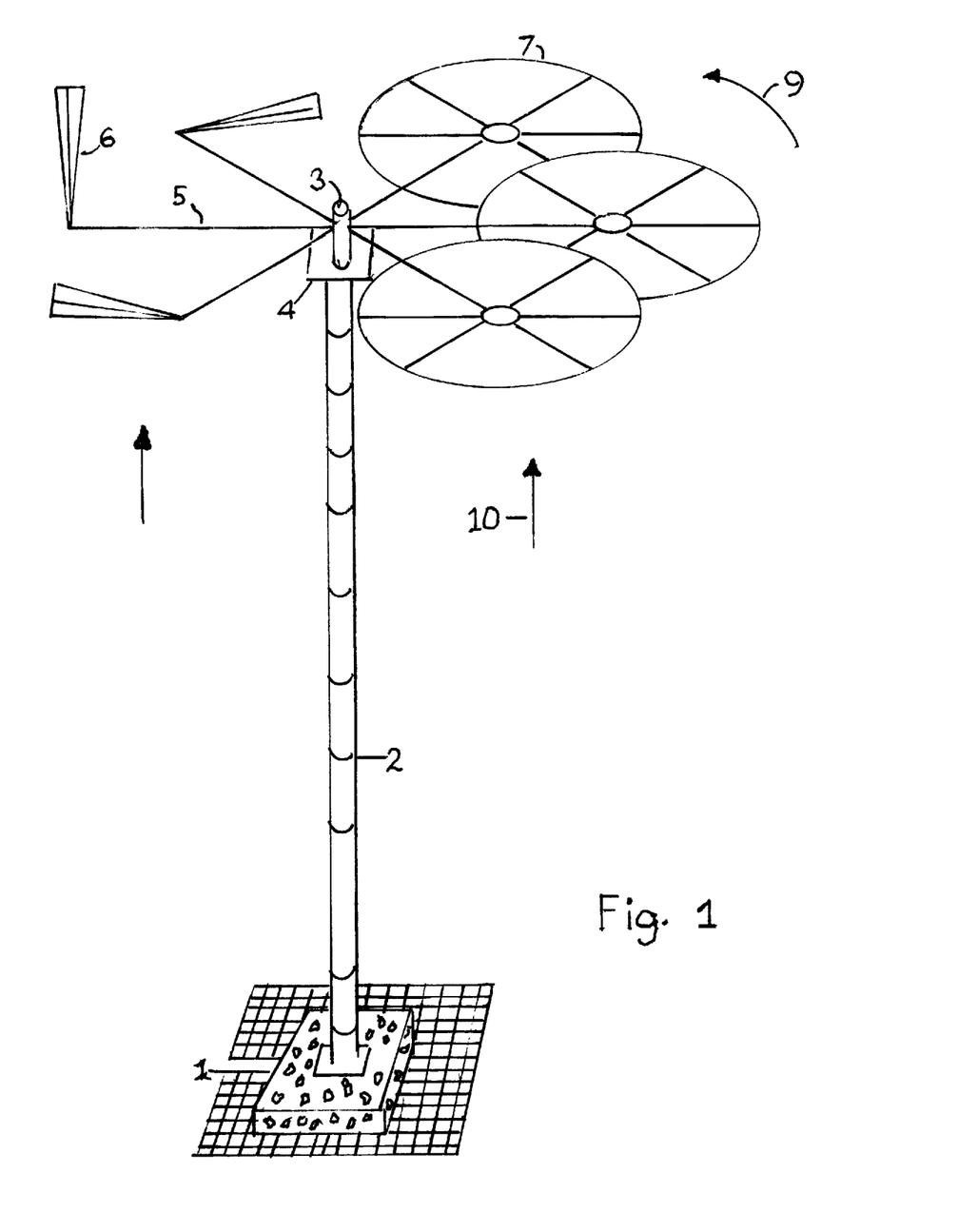
FIG. 1 is an environmental, perspective view of a wind turbine according to the present invention, wherein the wind turbine is mounted upon a turbine-receiving structure, such as a tower.

FIG. 1 shows an environmental, perspective view of a wind turbine 1 mounted upon a tower 2 that is supported by a base 1 of concrete or any solid material heavy enough and strong enough to support the tower 2 and turbine 1. The wind turbine 1 rotates in a circular orientation with respect to the vertical axis of the structure 2 during operation wherein the circular orientation is generally parallel to a ground surface. A rotating mandrel 3 is secured about an upper end of the tower 2 and is to which rotating arms or trusses 5 are solidly secured or attached. Mandrel 3 is fitted with pulley, sprocket or gears that drive any convenient, common power mechanism, generator, water pump, hydraulic pump, winch or combination of these. An umbrella-like vane 6,7 is mounted on the end of arm 5 opposite mandrel 3. Vanes 6,7 are the same vanes respectively in either an open position or a closed condition. When in the open position, the wind acts upon the face sides of the vanes 7 causing them to rotate until the back sides of the vanes 6 has come through rotation to be acted upon by the wind and closed by it for diminished wind resistance while rotating back to where the wind again opens and drives the vanes 7 in the direction shown by 9 until rotation again brings vanes 7 to where wind hits their back sides.

Figure 2:
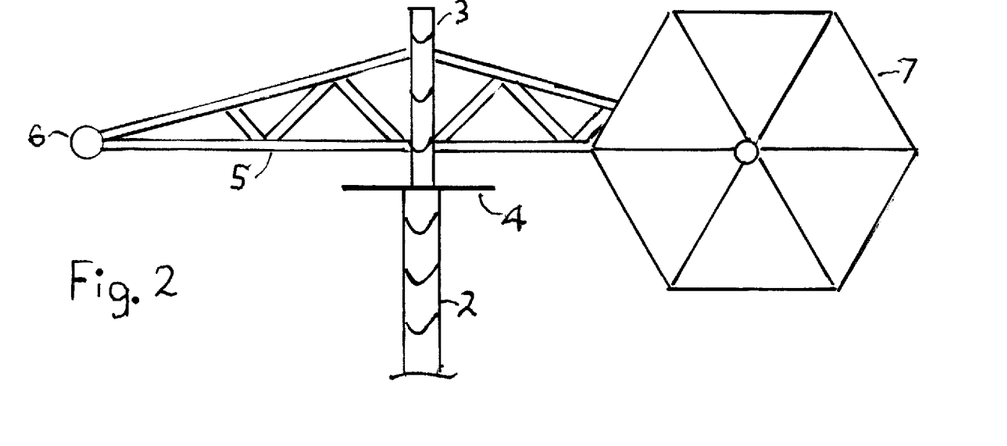
FIG. 2 is an environmental, elevational view of the wind turbine of FIG. 1.

FIG. 2 shows an environmental, elevational view of the turbine 1 showing a tower 2 with a platform 4 for mounting an energy-producing apparatus to be driven by the turbine 1. Platform 4 can be any convenient size and shape, placed at any height convenient to connect to a pulley, sprocket or gear that is used to drive the energy-producing apparatus. Mandrel 3 is shown with connecting arms or trusses 5 of any convenient length, construction of which can be light weight material strong enough to carry their own weight plus that of the umbrella-like vanes 6,7. Trusses 5 is preferably built similar to the drawings, with top and bottom cord with cross members tying them together for strength. Vanes 6,7 are shown respectively in closed and open positions.

Figure 3:
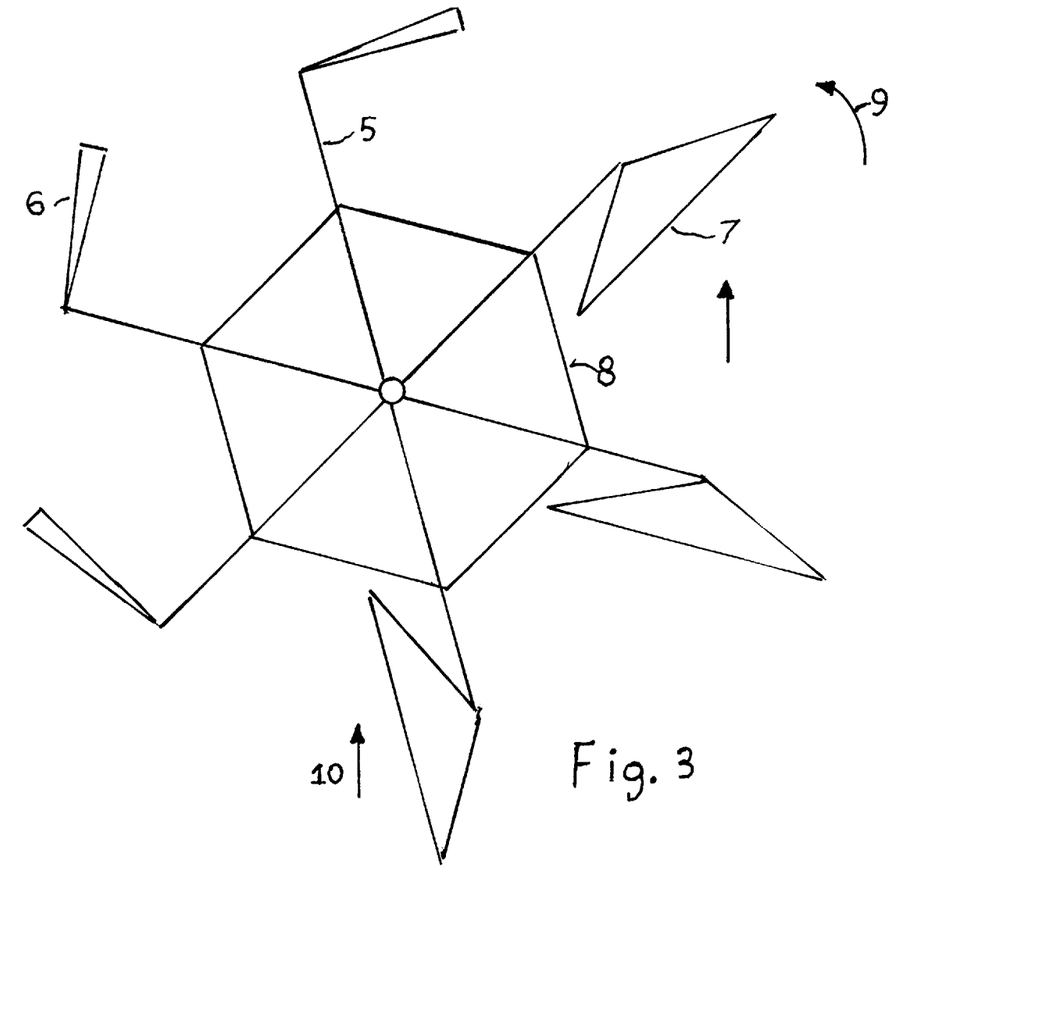
FIG. 3 is a top view of the wind turbine of FIG. 1.

FIG. 3 shows a top, plan view of the turbine 1. Wind direction is indicated by 10 showing that because the vanes 6,7 are positioned in a 360 degree circle, wind coming from any direction will act on the face sides of the vanes 7 on one half of the circle and concurrently on the back sides to close the vanes 6, thereby reducing drag vanes travel back to the opposite side of turbine 1 to again be driven with force. Bridge 8 is shown connecting arms or trusses 5 together to tie structure together so that force exerted at any point transmits through the entire wind turbine 1. Direction of rotation with respect to direction of the wind 10 is indicated by curved arrow 9.

Figure 4:
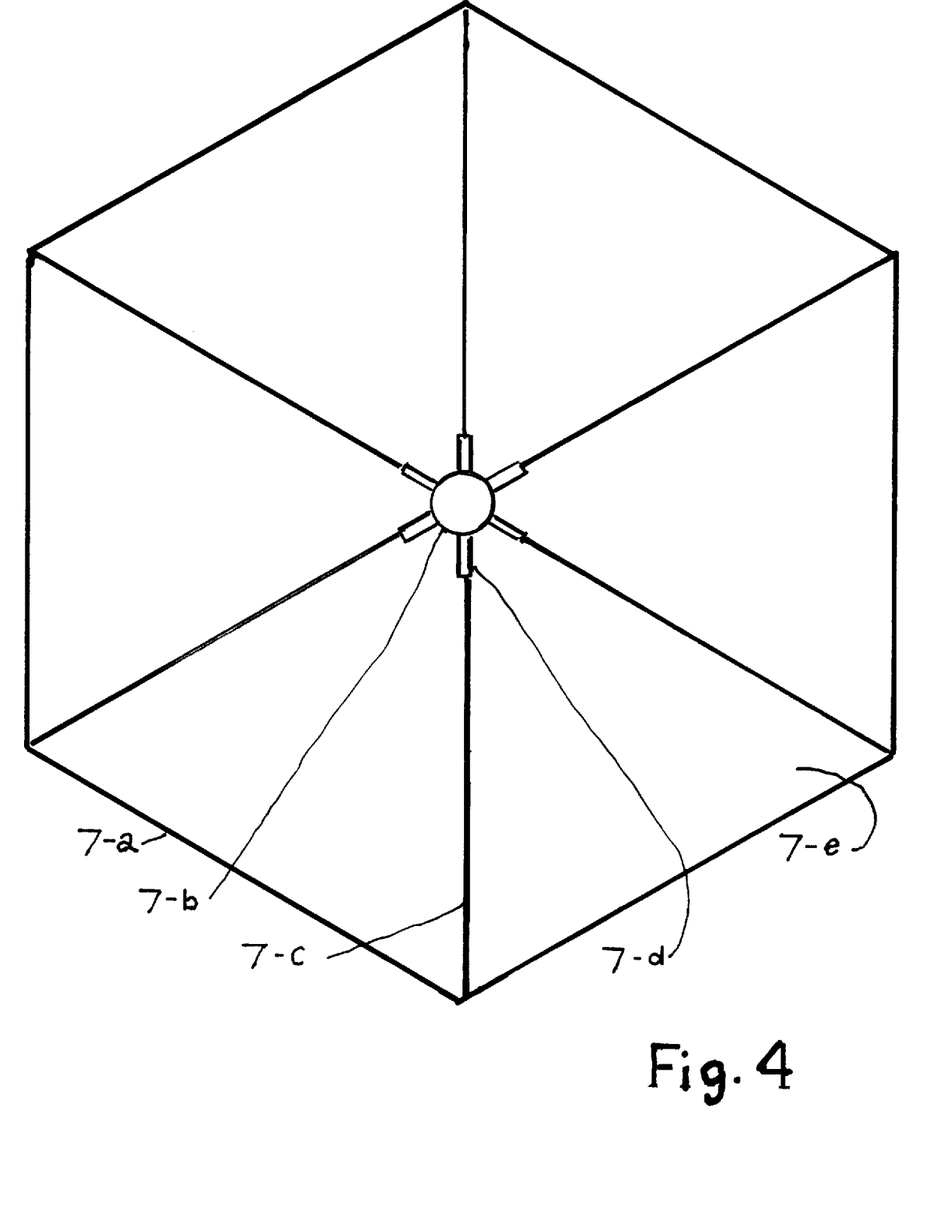
FIG. 4 is a front view of an umbrella-like vane of the wind turbine of FIG. 1.

FIG. 4 shows an umbrella-like vane with 7e being "sail cloth" or parachute cloth or any light-weight cloth selected for strength and having been treated for sun and weather resistance. Arms and trusses 5 shown in FIGS. 2 and 3 connect to and carry hub 7b to which pivoting, skeletal rod holder 7d is attached. Skeletal rods 7c are connected to ball bearings that are mounted in 7d, 7c and 7d are the opening and closing framework of the vane with cloth or fabric 7e being sewn or otherwise attached to the framework and with strong flexible cord 7a as an outer border of the vane and sized to take strain off from rods limiting their opening ability high winds. Flexible cord 7a also attaches to fabric 7e.

Figure 5:
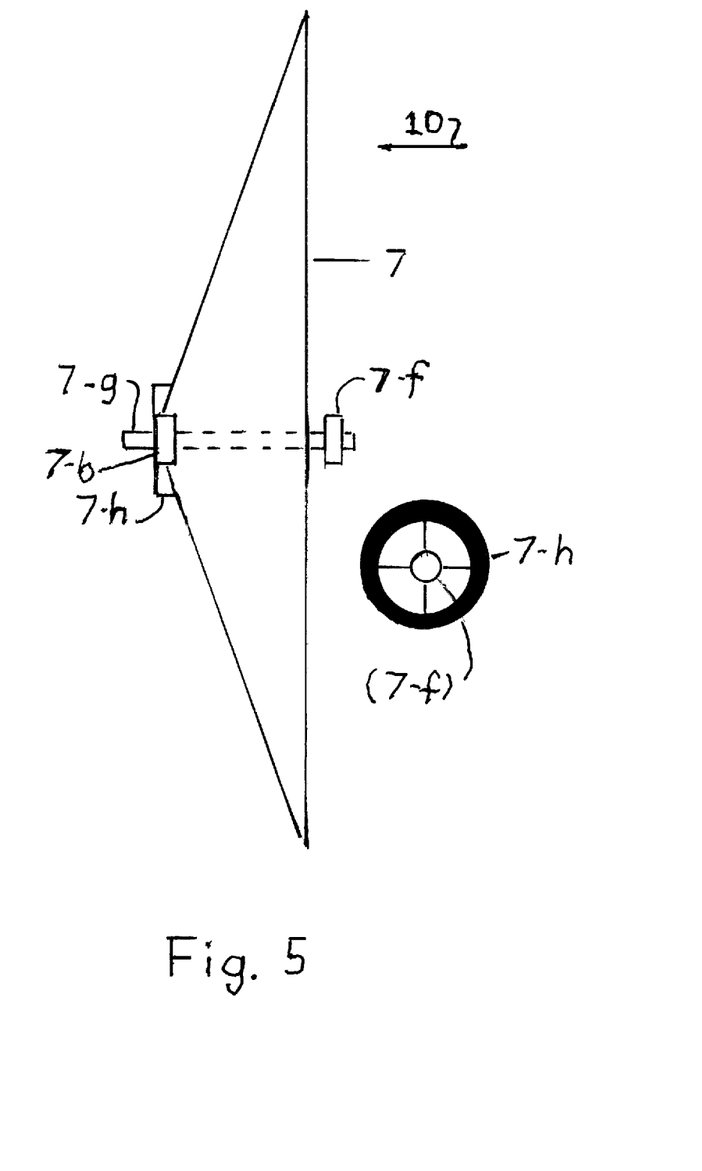
FIG. 5 is a side view of the umbrella-like vane of FIG. 4.

FIG. 5 shows a side view of an open umbrella-like vane 7 showing hub indicated by 7b and 7f. The hub 7b,7f has an outer ring or nut 7h that acts as a stop to limit the opening of the vane to a shape similar to that shown in the drawing. Bolt 7g and nut 7h attach vane hub 7f to arm or truss 5. Direction of the wind 10 is indicated to show direction of wind in relationship with opened vane.

Figure 6:
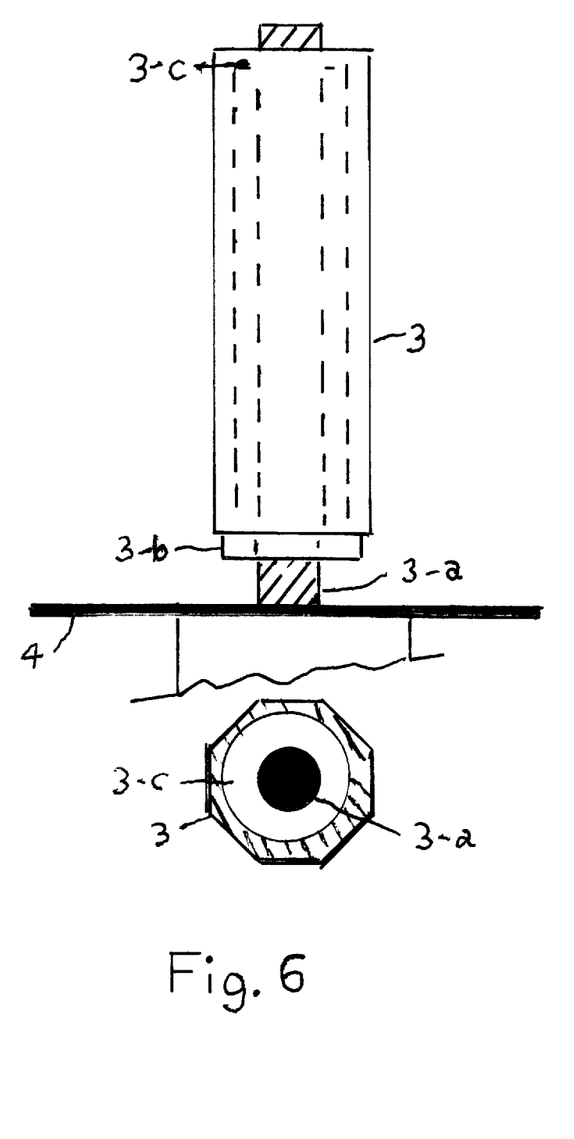
FIG. 6 is a top and elevation view of a mandrel of the wind turbine of FIG. 1.

FIG. 6 shows mandrel 3 which is preferably a metal tube that turns on bearings 3b,3c which are mounted on an inner shaft 3a. The inner shaft, alternatively could be longer, extending upward out of the outer shaft bearing assembly to have the trusses attach to it 3a above top of mandrel 3 which will in that case connect to tower support.

FIG. 9 shows a non-limiting example of wind turbine apparatus 100 where the wind turbine 1 and the speed-controlling transmission or apparatus (preferably speed-controlling transmission or apparatus 120) of the second aspect of the present invention are in operational communication with one another.

It is to be understood that the present invention is not limited to the embodiments and non-limiting examples described above or as shown in the attached figures, but encompasses any and all embodiments within the spirit of the invention.

What is claimed is:

1. A speed-controlling transmission or apparatus comprising:
    a first drive hub (121);
    a first drive rod (122);
    a first drive block (123);
    at least one first guide rail (124);
    a second drive rod (125);
    a second drive block (126);
    a lever (127);
    an adjustable fulcrum (128);
    a third drive block (129);
    a second drive rod (130);
    at least one second guide rail (131);
    a compressor or pump (132);
    a plurality of threaded rods (133);
    a first shaft (134);
    a drum (135);
    a second shaft (136);
    at least one centrifuge weight (137);
    at least one weight (138);
    a first cable (139);
    a first sprocket or pulley (140);
    a centrifuge housing (141);
    a second cable (142);
    a bearing assembly (143);
    a third shaft (144);
    a second sprocket or pulley (145);
    a support and bearing (146);
    a double sprocket (147);
    a transmission housing (148); and
    a third cable (149);
    a centrifuge-turning shaft (150); and
    a fourth cable (151),
    wherein a power source turns, rotates or moves said first drive hub (121), which pushes and pulls said first drive rod (122), which then pushes and pulls said first drive block (123), which travels on said at least one first guide rail (124) while moving to drive said second drive rod (125) to drive said second drive block (126) driving said lever (127) backward, or alternatively forward, which acting in conjunction with said adjustable fulcrum (128) and said third drive block (129) moves said first drive rod (122) on said at least one second guide rail (131) to push and pull reciprocating said first drive rod (122) that drives a compressor or pump (132) piston back and forth to compress gaseous material or to pump liquid,
    wherein said adjustable fulcrum (128) and said third drive block (129) both allow said lever (127) to slide up and down in them while said adjustable fulcrum (128) and driving actions take place,
    wherein said plurality of threaded rods (133) are rotated forward or backward to raise or lower said adjustable fulcrum (128) to change ratio of power to the compressor or pump (132) while concurrently giving resistance to the power source,
    wherein said plurality of threaded rods (133) are turned forward or backward by said first shaft (134) which is turned by pull of said second cable (142) that is pulled up and down by said bearing assembly (143), which is pulled up and down by said at least one centrifuge weight (137),
    wherein said bearing assembly (143) allows said first cable (139) to spin with centrifuge while being raised and lowered while it allows said second cable (142) to not spin as it is raised and lowered,
    wherein said first sprocket or pulley (140) spins said centrifuge housing wherein said at least one centrifuge weight (137), being spun about 360 degrees, create varying amounts of centrifugal force to pull said first cable (139) which pulls said bearing assembly (143) which pulls said second cable (142) which turns said second shaft (136), turning said drum and by said third cable (149) from said drum, being wound around said first shaft (134) which turns said threaded rods (133) to raise said adjustable fulcrum (128),
    wherein said at least one weight (138) reverses direction of actions of said cables when lower outside force allow for this and pulls said cables in a downward direction, thereby reversing all the actions related to said cables in an upward direction,
    wherein said first shaft (134) turns said plurality of threaded rods (133), to raise or lower said adjustable fulcrum (128) so that said lever (127) either exerts greater force upon work or greater resistance to turning of the power source while always converting the outside force into work to a greater or lesser degree,
    wherein said third shaft (144) is connected to and driven by and with the power source,
    wherein said third shaft (144) drives said second sprocket or pulley (145) which drives said double sprocket (147) that drives said speed-controlling transmission or apparatus and drives said first sprocket or pulley (140) that drives said centrifuge housing (141), wherein said support and bearing (146) is for bottom end of said third shaft (144), wherein said transmission housing (148) houses said speed-controlling transmission or apparatus, and can mount together with an outside structure, wherein said centrifuge housing (141) attaches to said transmission housing (148) or is built as an extension of said speed-controlling transmission or apparatus, wherein said centrifuge-turning shaft (150) turns or drives said centrifuge housing (141), and wherein said cable (151) drives said shaft (134) from said drum (135).

2. The speed-controlling transmission or apparatus according to claim 1, wherein said at least one first guide rail (124) is a pair of first guide rails (124).

3. The speed-controlling transmission or apparatus according to claim 2, wherein said at least one second guide rail (131) is a pair of second guide rails (131).

4. The speed-controlling transmission or apparatus according to claim 3, wherein said at least one centrifuge weight (137) is a pair of centrifuge weights (137).

5. The speed-controlling transmission or apparatus according to claim 1, wherein said at least one second guide rail (131) is a pair of second guide rails (131).

6. The speed-controlling transmission or apparatus according to claim 1, wherein said at least one centrifuge weight (137) is a pair of centrifuge weights (137).

7. A wind turbine apparatus comprising:
a wind turbine; and
a speed-controlling transmission or apparatus in operational use or communication with said wind turbine,
wherein said speed-controlling transmission or apparatus comprises:
a first drive hub (121),
a first drive rod (122),
a first drive block (123),
at least one first guide rail (124),
a second drive rod (125),
a second drive block (126),
a lever (127),
an adjustable fulcrum (128),
a third drive block (129),
a second drive rod (130),
at least one second guide rail (131),
a compressor or pump (132),
a plurality of threaded rods (133),
a first shaft (134),
a drum (135),
a second shaft (136),
at least one centrifuge weight (137),
at least one weight (138),
a first cable (139),
a first sprocket or pulley(140),
a centrifuge housing (141),
a second cable (142),
a bearing assembly (143),
a third shaft (144),
a second sprocket or pulley (145),
a support and bearing (146),
a double sprocket (147),
a transmission housing (148),
a third cable (149),
a centrifuge-turning shaft (150), and
a fourth cable (151), wherein a power source turns, rotates or moves said first drive hub (121), which pushes and pulls said first drive rod (122), which then pushes and pulls said first drive block (123), which travels on said at least one first guide rail (124) while moving to drive said second drive rod (125) to drive said second drive block (126) driving said lever (127) backward, or alternatively forward, which acting in conjunction with said adjustable fulcrum (128) and said third drive block (129) moves said first drive rod (122) on said at least one second guide rail (131) to push and pull reciprocating said first drive rod (122) that drives a compressor or pump (132) piston back and forth to compress gaseous material or to pump liquid, wherein said adjustable fulcrum (128) and said third drive block (129) both allow said lever (127) to slide up and down in them while said adjustable fulcrum (128) and driving actions take place, wherein said plurality of threaded rods (133) are rotated forward or backward to raise or lower said adjustable fulcrum (128) to change ratio of power to the compressor or pump (132) while concurrently giving resistance to the power source, wherein said plurality of threaded rods (133) are turned forward or backward by said first shaft (134) which is turned by pull of said second cable (142) that is pulled up and down by said bearing assembly (143), which is pulled up and down by said at least one centrifuge weight (137), wherein said bearing assembly (143) allows said first cable (139) to spin with centrifuge while being raised and lowered while it allows said second cable (142) to not spin as it is raised and lowered, wherein said first sprocket or pulley (140) spins said centrifuge housing wherein said at least one centrifuge weight (137), being spun about 360 degrees, create varying amounts of centrifugal force to pull said first cable (139) which pulls said bearing assembly (143) which pulls said second cable (142) which turns said second shaft (136), turning said drum and by said third cable (149) from said drum, being wound around said first shaft (134) which turns said threaded rods (133) to raise said adjustable fulcrum (128), wherein said at least one weight (138) reverses direction of actions of said cables when lower outside force allow for this and pulls said cables in a downward direction, thereby reversing all the actions related to said cables in an upward direction, wherein said first shaft (134) turns said plurality of threaded rods (133), to raise or lower said adjustable fulcrum (128) so that said lever (127) either exerts greater force upon work or greater resistance to turning of the power source while always converting the outside force into work to a greater or lesser degree, wherein said third shaft (144) is connected to and driven by and with the power source, wherein said third shaft (144) drives said second sprocket or pulley (145) which drives said double sprocket (147) that drives said speed-controlling transmission or apparatus and drives said first sprocket or pulley (140) that drives said centrifuge housing (141), wherein said support and bearing (146) is for bottom end of said third shaft (144), wherein said transmission housing (148) houses said speed-controlling transmission or apparatus, and can mount together with an outside structure, wherein said centrifuge housing (141) attaches to said transmission housing (148) or is built as an extension of said speed-controlling transmission or apparatus, wherein said centrifuge-turning shaft (150) turns or drives said centrifuge housing (141), and wherein said cable (151) drives said shaft (134) from said drum (135).

8. The wind turbine apparatus according to claim 7, wherein said wind turbine comprises:

a mandrel, wherein said mandrel is adapted for being secured for operation to a turbine-receiving structure having a generally vertical axis and a sufficient height, a plurality of supporting arms extending laterally away from said mandrel, wherein each of said plurality of supporting arms comprises a first end, a second end, and a body extending from said first end to said second end, and wherein said first end of said each of said plurality of supporting arms is located proximate said rotating mandrel, and a plurality of umbrella-like vanes, wherein each of said plurality of umbrella-like vanes comprises a face side and a back side and is adapted for being alternatively placed in an open configuration and a closed configuration during operation, wherein said each of said plurality of umbrella-like vanes is secured at a location along a corresponding supporting arm of said plurality of supporting arms, wherein said plurality of supporting arms and said plurality of umbrella-like vanes are adapted for rotating in a generally circular orientation with respect to the vertical axis of the turbine-receiving structure during operation wherein said circular orientation is generally parallel to a ground surface, and wherein said each of said plurality of umbrella-like vanes, when opened or in said open configuration, provides a solid surface for the wind to act upon but, as said plurality of umbrella-like vanes rotate around the vertical axis of the turbine-receiving structure, said each of said plurality of umbrella-like vanes provides said back side for the wind to act upon and to give little resistance to the wind so as to return said each of said plurality of umbrella-like vanes to said closed configuration as said each of said plurality of umbrella-like vanes rotates into position to be opened and acted upon again, repetitively, as solid rotatable surfaces.

9. The wind turbine apparatus according to claim 8, wherein at least one supporting arm of said plurality of supporting arms forms an angle of about ninety degrees with the vertical axis of the turbine-receiving structure.

10. The wind turbine apparatus according to claim 8, wherein said each of said plurality of umbrella-like vanes is secured proximate said second end of a corresponding supporting arm of said plurality of supporting arms.

11. The wind turbine apparatus according to claim 8, wherein the turbine-receiving structure is a tower or pole.

12. The wind turbine apparatus according to claim 8, wherein speed of rotation of said rotating mandrel is directly proportional to speed of the wind.

13. The wind turbine apparatus according to claim 8, wherein power produced is directly proportional to size, in square feet surface, of said plurality of vanes times force or speed of the wind, and wherein torque is proportional to length of said plurality of supporting arms.

14. The wind turbine apparatus according to claim 8, wherein said plurality of umbrella-like vanes are at least six umbrella-like vanes.

15. The wind turbine apparatus according to claim 8, wherein said plurality of umbrella-like vanes are secured on said plurality of supporting arms that are connected by bridging so that turning action is transmitted from any one of said plurality of umbrella-like vanes into and through a system of said plurality of supporting arms.

16. The wind turbine apparatus according to claim 8, wherein said plurality of supporting arms are made of a lightweight material.

17. The wind turbine apparatus according to claim 16, wherein said lightweight material is aluminum.

18. The wind turbine apparatus according to claim 8, wherein said plurality of umbrella-like vanes are made of a lightweight material.

19. The wind turbine apparatus according to claim 18, wherein said lightweight material is selected from the group consisting of sail cloth and parachute cloth.

20. The wind turbine apparatus according to claim 8, wherein said plurality of umbrella-like vanes are made of a strong material that is sun and weather resistant.

21. The wind turbine apparatus according to claim 8, wherein said rotating mandrel is centrally positioned with respect to said plurality of supporting arms.

22. The wind turbine apparatus according to claim 8, further comprising a turbine-receiving structure.

23. The wind turbine apparatus according to claim 22, wherein said turbine-receiving structure is a tower or pole.

24. The wind turbine apparatus according to claim 7, wherein said wind turbine comprises:

a rotating mandrel, wherein said rotating mandrel is adapted for being rotatably secured for operation to a turbine-receiving structure having a generally vertical axis and a sufficient height;

a plurality of supporting arms extending laterally away from said rotating mandrel, wherein each of said plurality of supporting arms comprises a first end, a second end, and a body extending from said first end to said second end, wherein said first end of said each of said plurality of supporting arms is located proximate said rotating mandrel, and wherein at least one supporting arm of said plurality of supporting arms forms an angle of about ninety degrees with the vertical axis of the turbine- receiving structure; and a plurality of umbrella-like vanes, wherein each of said plurality of umbrella-like vanes comprises a face side and a back side and is adapted for being alternatively placed in an open configuration and a closed configuration during operation, wherein said each of said plurality of umbrella-like vanes is secured proximate said second end of a corresponding supporting arm of said plurality of supporting arms, wherein said rotating mandrel, said plurality of supporting arms and said plurality of umbrella-like vanes are adapted for rotating in a generally circular orientation with respect to the vertical axis of the turbine-receiving structure during operation wherein said circular orientation is generally parallel to a ground surface, and wherein said each of said plurality of umbrella-like vanes, when opened or in said open configuration, provides a solid surface for the wind to act upon but, as said plurality of umbrella-like vanes rotate around the vertical axis of the turbine-receiving structure, said each of said plurality of umbrella-like vanes provides said back side for the wind to act upon and to give little resistance to the wind so as to return said each of said plurality of umbrella-like vanes to said closed configuration as said each of said plurality of umbrella-like vanes rotates into position to be opened and acted upon again, repetitively, as solid rotatable surfaces.

25. The wind turbine apparatus according to claim 24, further comprising a turbine-receiving structure.

26. The wind turbine apparatus according to claim 24, wherein at least one supporting arm of said plurality of supporting arms forms an angle of about ninety degrees with the vertical axis of the turbine-receiving structure.

27. The wind turbine apparatus according to claim 24, wherein said each of said plurality of umbrella-like vanes is secured proximate said second end of a corresponding supporting arm of said plurality of supporting arms.

28. The wind turbine apparatus according to claim 7, wherein said wind turbine comprises a mandrel, a plurality of supporting arms or trusses, and a plurality of umbrella-like vanes, and wherein said wind turbine is adapted for rotating in a generally circular orientation with respect to the vertical axis of a turbine-receiving structure during operation wherein the circular orientation is generally parallel to a ground surface.

\* \* \* \* \*